United States Patent [19]

Lupke et al.

[11] 4,180,357

[45] Dec. 25, 1979

[54] APPARATUS AND METHOD FOR PERFORATING TUBING AND METHOD OF PRODUCING PART OF SUCH APPARATUS

[76] Inventors: Gerd P. H. Lupke, 46 Stornoway Crescent; Manfred A. A. Lupke, 35 Ironshield Crescent, both of Thornhill, Ontario, Canada

[21] Appl. No.: 881,417

[22] Filed: Feb. 27, 1978

[30] Foreign Application Priority Data

Mar. 18, 1977 [CA] Canada .................................. 274316

[51] Int. Cl.[2] ........................... B23C 3/00; B26D 3/06

[52] U.S. Cl. ....................................... 409/131; 83/54; 144/218; 407/66; 409/148; 409/158; 409/184

[58] Field of Search ...................... 90/11 C, 83; 83/54, 83/175, 322, 340, 680, 830, 831, 833, 834, 853, 84, 86; 144/218; 407/66, 70, 91, 100–102, 108, 109, 114–116

[56] References Cited

U.S. PATENT DOCUMENTS

| | | | |
|---|---|---|---|
| 388,900 | 9/1888 | Millett, Jr. | 144/218 |
| 1,631,231 | 6/1927 | Stukart | 83/86 |
| 2,337,663 | 12/1943 | Jones | 407/91 X |
| 3,247,746 | 4/1966 | Nystrand | 83/342 |
| 3,370,491 | 2/1968 | Cross | 83/37 |
| 3,620,115 | 11/1971 | Fieg et al. | 83/226 |
| 3,821,912 | 7/1974 | Howe | 83/54 |
| 3,824,886 | 7/1974 | Hegler | 83/54 X |
| 3,831,470 | 8/1974 | Maroschak | 83/54 X |
| 3,848,491 | 11/1974 | Flesch | 83/86 X |
| 3,910,713 | 10/1975 | Maroshak | 408/1 R |
| 3,916,763 | 11/1975 | Maroshak | 409/172 |
| 3,957,386 | 5/1976 | Lupke | 408/50 |
| 3,965,782 | 6/1976 | Leloux | 83/15 |
| 4,000,672 | 1/1977 | Sitterer et al. | 83/203 |
| 4,055,098 | 10/1977 | Leloux | 83/309 |
| 4,112,810 | 9/1978 | Dreibelbis | 83/54 X |

FOREIGN PATENT DOCUMENTS

| | | | |
|---|---|---|---|
| 747712 | 12/1966 | Canada . | |
| 618648 | 2/1949 | United Kingdom | 144/218 |
| 1269397 | 4/1972 | United Kingdom | 83/54 |

*Primary Examiner*—Z. R. Bilinsky
*Attorney, Agent, or Firm*—Ridout & Maybee

[57] ABSTRACT

Corrugated tubing is advanced along its axial path by rotatably driven lead screw members the screw threading of which is in meshing engagement with the corrugations of the tubing, the lead screw members being in pairs with the screw threading of the members of each pair being of opposite hand and the lead screw members of each pair being rotated in opposite directions. The lead screw members of each pair present outwardly directed cutters which are synchronized substantially simultaneously to intersect the tubing thereby, in perforating the tubing, to restrain the tubing against rotation thereof about the axial path. There is also disclosed a method of producing the lead screw members with the outwardly projecting cutters mounted thereon.

26 Claims, 21 Drawing Figures

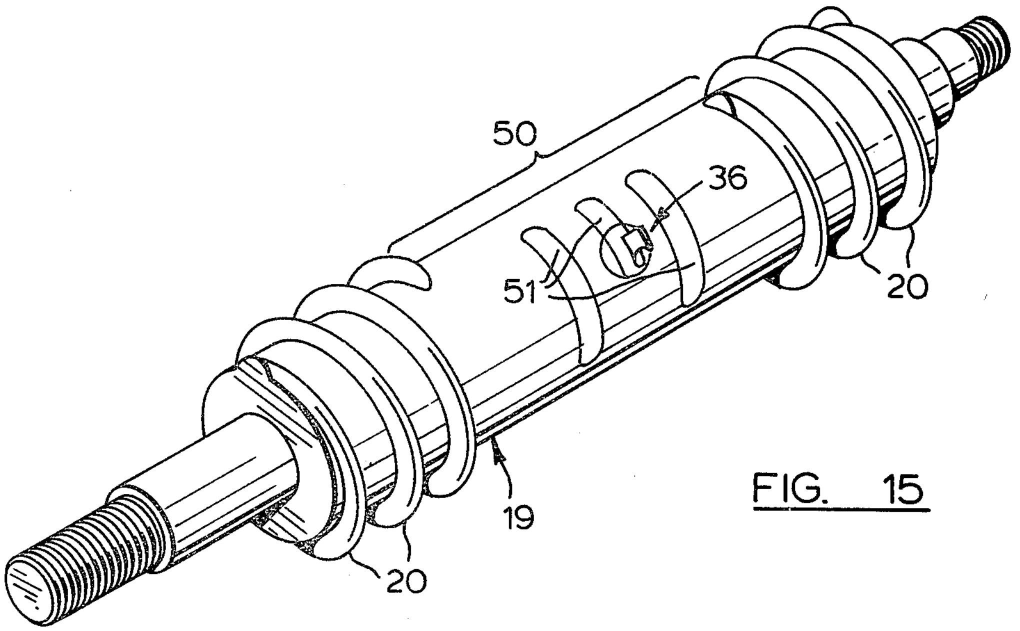
FIG. 15
FIG 14
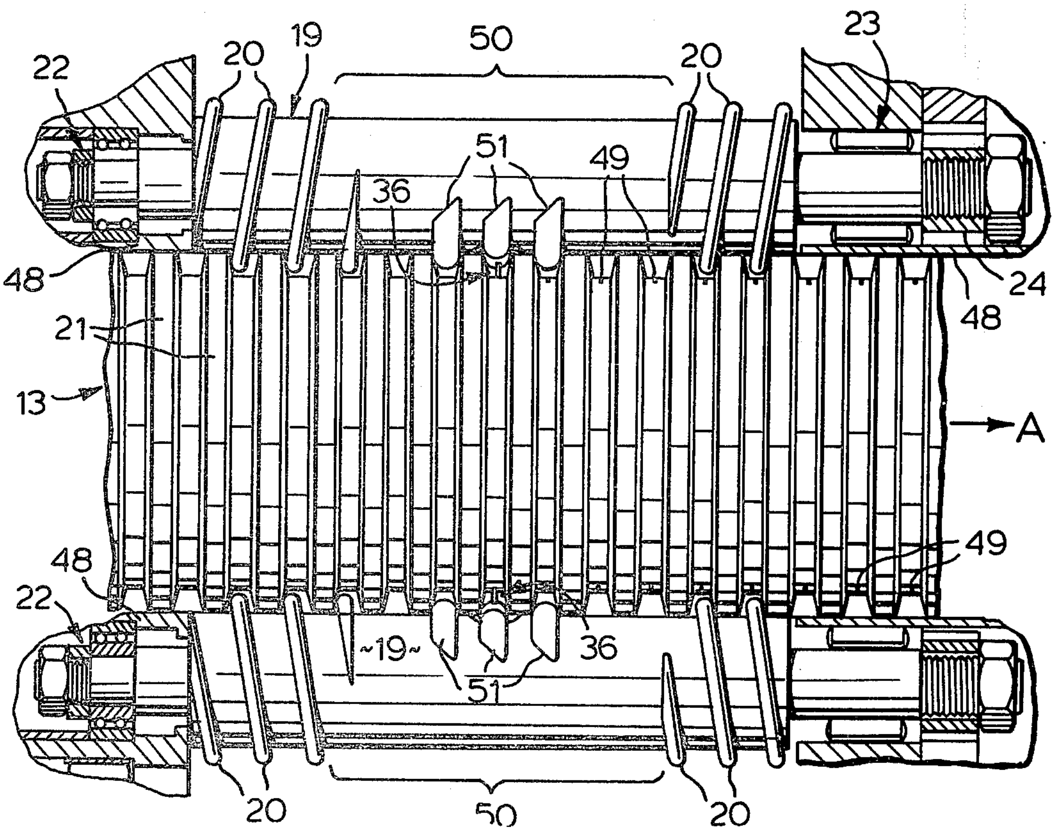

APPARATUS AND METHOD FOR PERFORATING TUBING AND METHOD OF PRODUCING PART OF SUCH APPARATUS

This invention is concerned with apparatus for perforating tubing. Such tubing which may be of a thermoplastic material such as, for example, polyethylene, may be used as underground drainage piping, water operatively percolating into the tubing through the perforations therein for drainage along the tubing.

It has hitherto been proposed to form the perforations in such tubing by passing the unperforated tubing after its formation in, for example, a blow-moulding apparatus to an apparatus in which rotary cutter means is engaged with the walls of the tubing to form the required perforations. Such apparatus is disclosed in U.S. Pat. No. 3,957,386 issued on May 18, 1976 and in Canadian Patent application No. 260,094 filed on Aug. 27, 1976. The forms of apparatus disclosed in the above-numbered United States patent and Canadian patent application are, however, relatively complex, and it is accordingly a primary object of one aspect of the present invention to provide apparatus for perforating tubing which substantially obviates or mitigates the above disadvantage of the forms of apparatus disclosed in the above-numbered United States patent and Canadian patent application in that it is relatively simple and as a result very dependable in operation.

According to this one aspect of the present invention there is provided apparatus which comprises drive means for advancing the tubing along an axial path thereof, and at least one cutter spaced from a fixed axis which is spaced from and substantially parallel to said axial path of the tubing. The cutter is mounted for rotation through complete revolutions about said fixed axis in a circular rotary path which intersects the tubing for intermittent intersection of the tubing by the cutter at discrete points on the tubing. The apparatus further comprises support means for supporting the tubing and restraining the tubing against rotation thereof about said axial path during operative intersection of the tubing by the cutter.

The present invention is also concerned with a method of perforating tubing, and it is a primary object of a further aspect of the invention to provide such a method.

According to this further aspect of the present invention there is provided a method of perforating tubing, the method comprising the steps of advancing the tubing along an axial path thereof, and simultaneously moving at least one cutter through complete revolutions about a fixed axis from which the cutter is spaced and which is spaced from and substantially parallel to said axial path of the tubing. Said rotation of the cutter is in a circular rotary path which intersects the tubing thereby to perforate the tubing by intermittent intersection of the tubing by the cutter at discrete points on the tubing. The tubing is supported and is restrained against rotation thereof about said axial path during intersection of the tubing by the cutter.

In a preferred embodiment of the apparatus according to the present invention, the drive means for advancing the tubing along the axial path thereof comprises at least one lead screw member which is disposed substantially parallel to said axial path of the tubing and which has screw threading for meshing engagement with corrugations presented by the tubing, the lead screw member being rotatably drivable for advancing the tubing along said axial path, and the cutter of the apparatus being mounted on the lead screw member for rotation therewith. According to a still further aspect of the present invention there is provided a method of producing such a lead screw member, this method comprising the steps of forming at least one recess in the cylindrical wall of a cylindrical member, mounting a plug within said recess, forming screw threading on the cylindrical wall of the cylindrical member while the plug is mounted in the recess, forming a slot in the plug, and mounting an outwardly projecting cutter within the slot. The interengagement between the plug and the recess causes clamping of the cutter within the slot.

In order that the present invention may be more clearly understood and more readily carried into effect the same will now, by way of example, be more fully described with reference to the accompanying drawings in which:

FIG. 14 is a partially sectioned side view corresponding to a portion of FIG. 2, but showing apparatus according to a still further embodiment of the invention;

FIG. 15 is an isometric view of part of the apparatus shown in FIG. 14;

Figure 1:
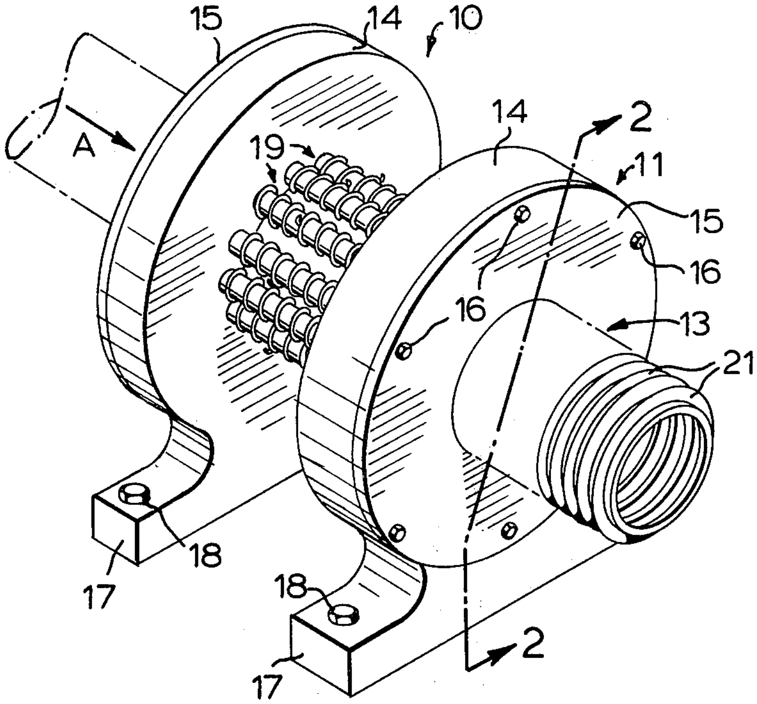
FIG. 1 is a view of apparatus according to a preferred embodiment of the invention.

Referring to FIGS. 1 to 13, inclusive, of the drawings, the apparatus comprises a frame structure constituted, in the preferred embodiment of the invention, by two spaced end housings 10 and 11 which have coaxially disposed central openings 12 through which tubing 13 which may be of thermoplastic material is operatively advanced in the direction of the arrow A (FIG. 1), as is hereinafter described. Each of the end housings 10 and 11 comprises a body member 14, and an end cover 15 which is secured to the associated body member 14 by, for example, bolts 16, each body member 14 presenting a base 17 which is adapted to be secured to a support surface by means of bolts 18.

The apparatus further comprises drive means for advancing the tubing 13 along the axial path A thereof, this drive means comprising, in the preferred embodiment shown in the drawings, a plurality of lead screw members 19 having screw threading 20 for meshing engagement with corrugations 21 presented by the tubing 13. The lead screw members 19 the fixed axes of which are spaced from and disposed substantially parallel to the axial path A of the tubing 13 and which extend between the end housings 10 and 11 are each rotatably mounted in these end housings 10 and 11, the end portions of the lead screw members 19 which are rotatably mounted in the end housing 10 being so mounted by means of ball bearings which are denoted generally by the reference numerals 22 and which may be of conventional form, and the end portions of the lead screw members 19 which are rotatably mounted in the end housing 11 being so mounted by means of roller bearings which are denoted generally by the reference numerals 23 and which may likewise be of conventional form.

A gear wheel 24 is screw-threadedly mounted on the end portion of each lead screw member 19 within the end housing 11 and is locked by a nut 25. A drive shaft 26 which is disposed substantially parallel to the axial path A is journalled in the body members 14 of the end housings 10 and 11 by means of roller bearings which are denoted generally by the reference numerals 27 and which may again be of conventional form, the end portion of the shaft 26 within the end housing 11 having a gear wheel 28 keyed thereto, and the opposed end portion of the shaft 26 extending through an opening in the end cover 15 of the housing 10 and projecting therefrom for connection to an appropriate drive means (not shown) for operatively rotating the drive shaft 26.

Figure 3:
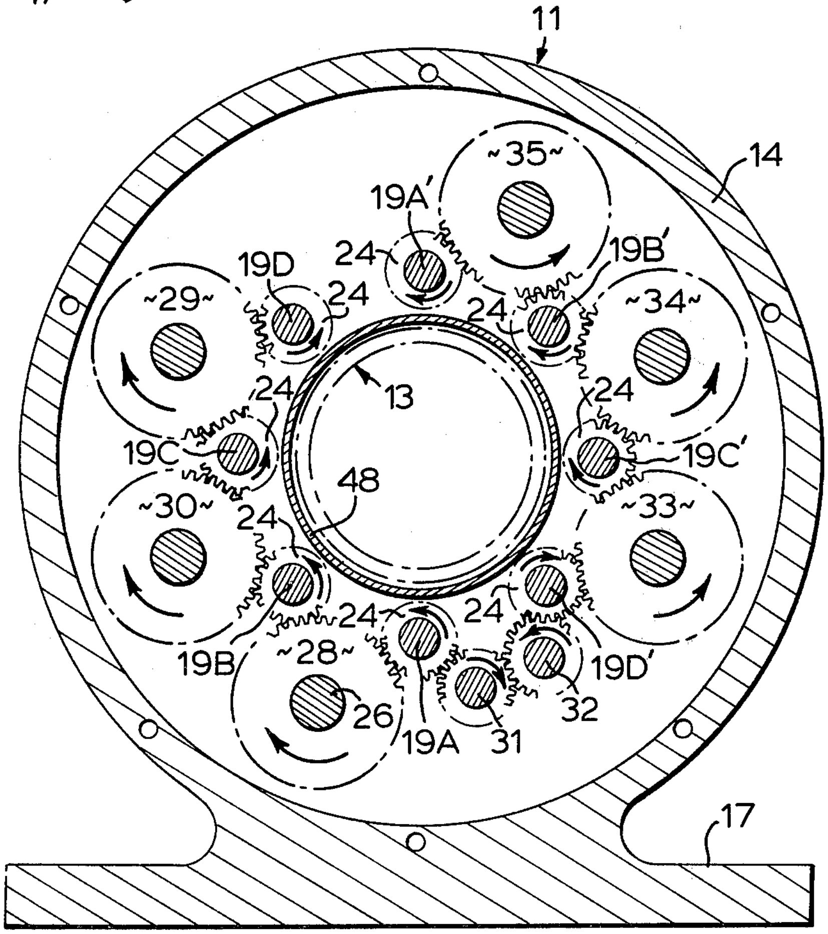
FIG. 3 is a sectioned end view on the line 3—3 in FIG. 2.
Figure 2:
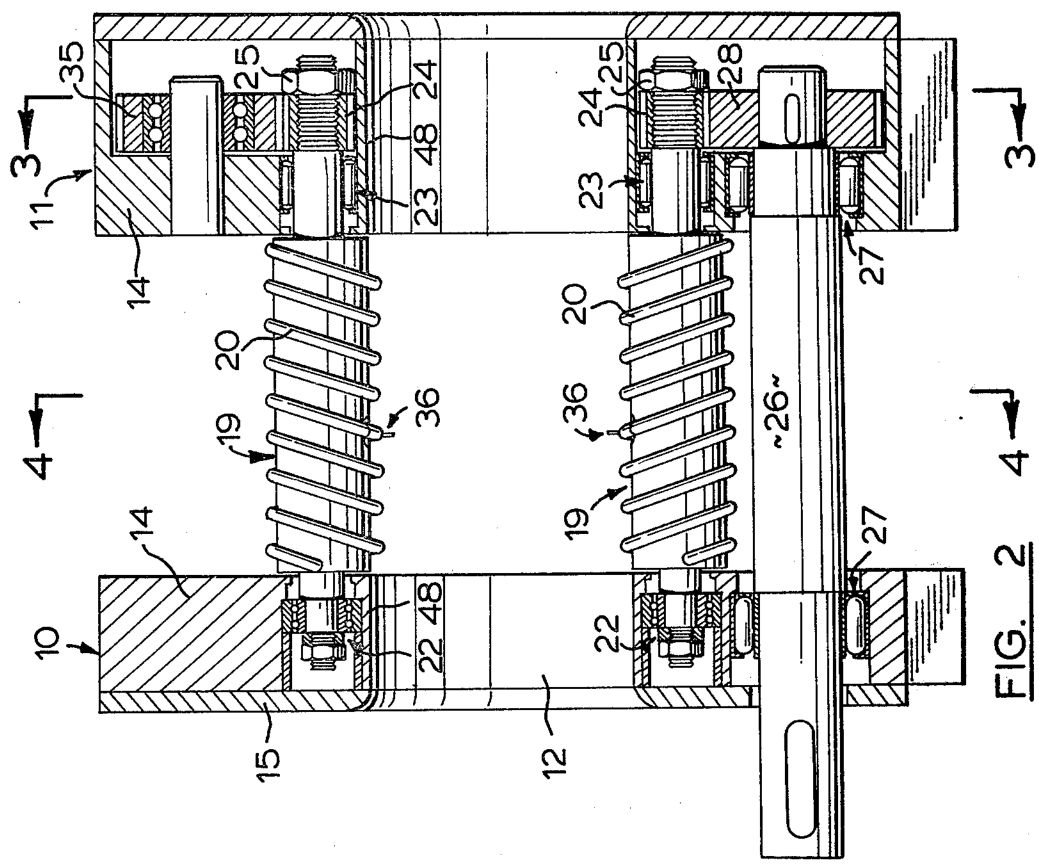
FIG. 2 is a sectioned side view, on an enlarged scale, generally on the line 2—2 in FIG. 1.

As is most clearly shown in FIG. 3, the gear wheel 28 operatively drives the gear wheels 24 of all the lead screw members 19 through idler gears 29, 30, 31, 32, 33, 34 and 35. More particularly, the lead screw members 19 are disposed in pairs, with the lead screw members 19 of each pair thereof preferably being diametrically opposed relative to the axial path A. Thus, with reference to the preferred embodiment of the invention, the pairs of lead screw members 19 are constituted by the members 19A and 19A', 19B and 19B', 19C and 19C', and 19D and 19D', the gear wheels 24 of the members 19A and 19B being operatively driven in the same direction directly by the gear wheel 28, the gear wheel 24 of the member 19C being operatively driven in said same direction by the idler gear wheel 30 which is driven by the gear wheel 24 of the member 19B, and the gear wheel 24 of the member 19D being operatively driven again in said same direction by the idler gear wheel 29 which is driven by the gear wheel 24 of the member 19C. The gear wheel 24 of the member 19D' is operatively driven but in the opposite direction through the two idler gear wheels 31, 32 from the gear wheel 24 of the member 19A, the gear wheel 24 of the member 19C' is operatively driven in said opposite direction by the idler gear wheel 33 which is driven by the gear wheel 24 of the member 19D', the gear wheel 24 of the member 19B' is operatively driven again in said opposite direction by the idler gear wheel 34 which is driven by the gear wheel 24 of the member 19C', and the gear wheel 24 of the member 19A' is operatively driven once again in said opposite direction by the idler gear wheel 35 which is driven by the gear wheel 24 of the member 19B'. The screw threading 20 of the lead screw members 19 of each pair thereof is of opposite hand.

Mounted on each of the lead screw members 19 is a cutter 36 which is operatively moved through complete revolution with the associated lead screw member 19 only about the fixed axes thereof and in a fixed rotary path of circular form which is thus in a plane substantially at right angles to the axial path A and which intersects the tubing 13 by intermittent intersection of the tubing 13 by the cutter 36 at discrete points on the tubing 13 thereby to perforate the tubing 13 by intermittent intersection of the tubing 13 by the cutter 36 as is hereinafter more fully described, each cutter 36 being outwardly directed relative to said rotary path thereof. There may of course be more than one cutter 36 mounted on each of the lead screw members 19.

Figure 5:
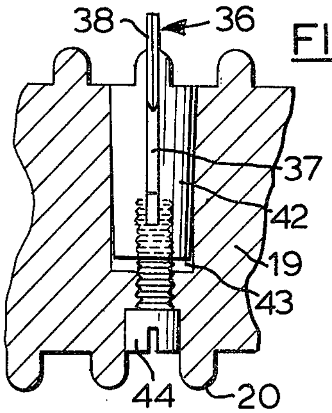
FIG. 5 is a sectioned view, on a further enlarged scale, on the line 5—5 in FIG. 4.
Figure 6:
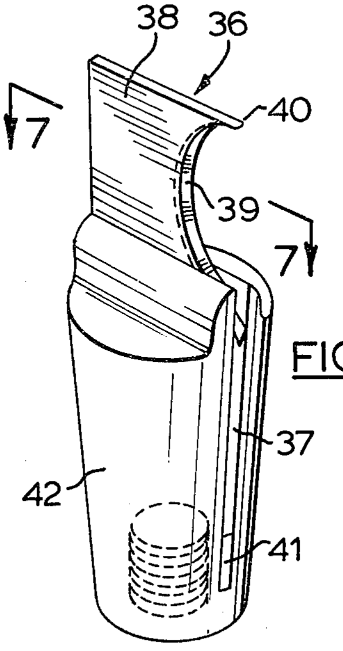
FIG. 6 is a view, on a still further enlarged scale, of part of the apparatus according to the preferred embodiment shown in the preceding views.
Figure 7:
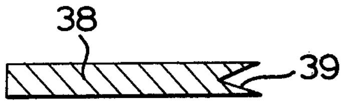
FIG. 7 is a sectioned view on the line 7—7 in FIG. 6.

As is most clearly shown in FIGS. 5, 6 and 7, each cutter 36 comprises an inner shank portion 37 together with an outer cutting portion 38 having a concave leading edge 39 which constitutes a cutting edge and is preferably of V-shape in cross-section as shown in FIG. 7 and which terminates at the end of the cutting portion 38 remote from the shank portion 37 in a cutting point 40. The shank portion 37 of the cutter 36 is disposed within a slot 41 which is formed in a plug 42, the plug 42 being removably mounted in a recess 43 within the associated lead screw member 19 by means of a screw member 44 which is screw-threadedly engaged with the plug 42. The shank portion 37 of the cutter 36 is securely clamped in the slot 41 under the influence of the interengagement between the plug 42 and the walls of the recess 43. Thus, for example, in the preferred embodiment of the invention shown in the drawings, the plug 42 is of tapered form so that as the plug 42 is urged into the recess 43 on tightening of the screw member 44 the width of the slot 41 is reduced with resultant clamping of the shank portion 37 of the cutter 36 in the slot 41.

Figure 8:
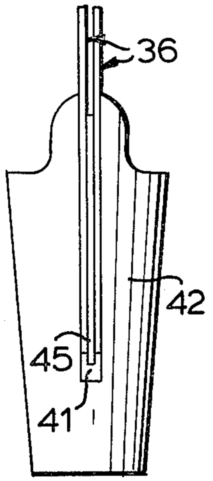
FIG. 8 is a side view of the part of the apparatus shown in FIG. 6, but according to an alternative embodiment of the invention.

FIG. 8 shows an alternative embodiment which differs from that described above with reference to FIGS. 5, 6 and 7 in that there are two cutters 36 disposed within the slot 41 in the plug 42, the two cutters 36 being separated by a spacer member 45.

Figure 9:
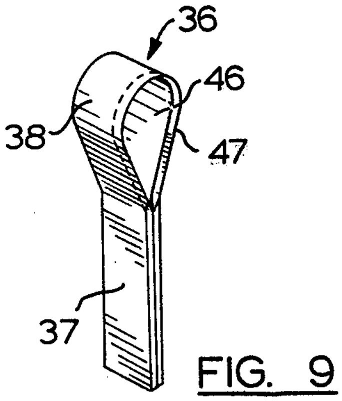
FIG. 9 is a view of a part of the apparatus according to a still further embodiment of the invention.

FIG. 9 shows an alternative form of cutter 36 which is formed of a strip of metal which is reflexly bent with the contacting side-by-side end portions of the strip constituting the shank portion 37 of the cutter 36, the cutting portion 38 being in the form of a loop 46 having a leading edge 47 which is sharpened to provide a cutting edge.

In operation, the drive shaft 26 is rotatably driven with, as hereinbefore described, resultant rotation of the lead screw members 19 in the directions shown in FIG. 3. The screw threading 20 of the members 19 is in meshing engagement with the corrugations 21 of the tubing 13 so that said rotation of the lead screw members 19 causes advancement of the tubing 13 along the axial path A.

Figure 4:
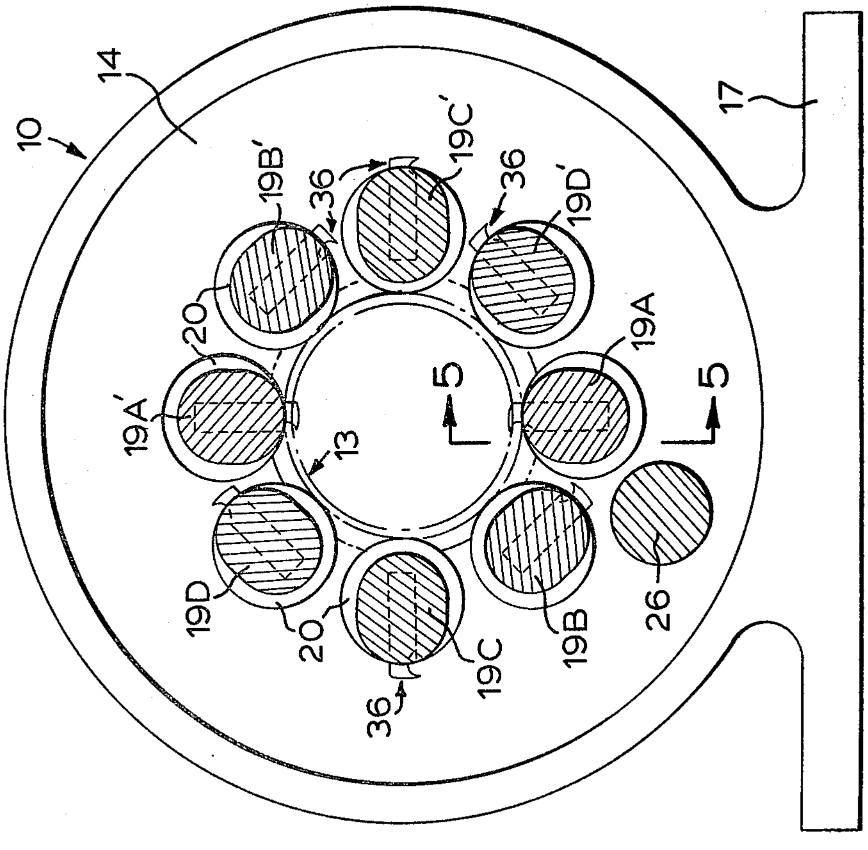
FIG. 4 is a sectioned view on the line 4—4 in FIG. 2.

Said rotation of the lead screw members 19 also, of course, causes rotation of each cutter 36 in its rotary path, and as each cutter 36 intersects the tubing 13 the tubing is thereby perforated. FIG. 4 shows the operative condition in which the cutters 36 mounted on the pair of lead screw members 19A and 19A' are perforating the tubing 13. The cutters 36 mounted on each said pair of the lead screw members 19 are synchronized for substantially simultaneous intersection with the tubing 13 and since these cutters 36 rotate in opposite directions they operatively exert on the tubing 13 during perforation of the tubing 13 substantially equal but opposite forces. Thus, these cutters 36 mounted on each said pair of the members 19 constitute means for restraining the tubing 13 against rotation during operative intersection of the tubing 13 by these cutters 36. Furthermore, the lead screw members 19, together with annular portions 48 of the body members 14 of the end housings 10 and 11, constitute support means for supporting the tubing 13.

Figure 13:
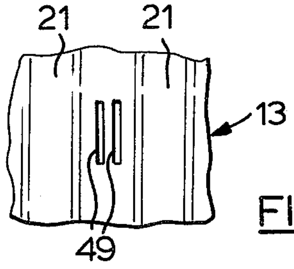
FIG. 13 is a side view of a portion of perforated tubing produced by apparatus according to the alternative embodiment shown in FIG. 8.
Figure 10:
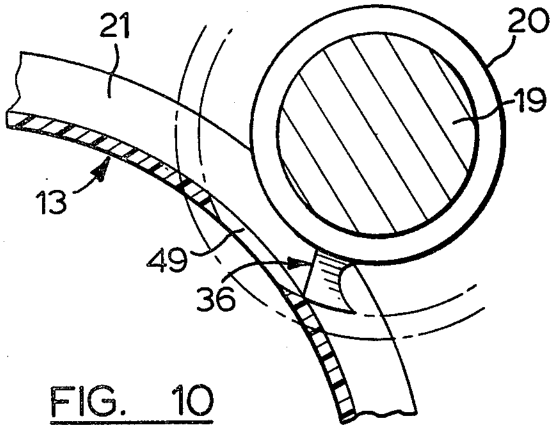
FIG. 10 is a view showing a feature of the apparatus according to the preferred embodiment of the invention.
Figure 12:
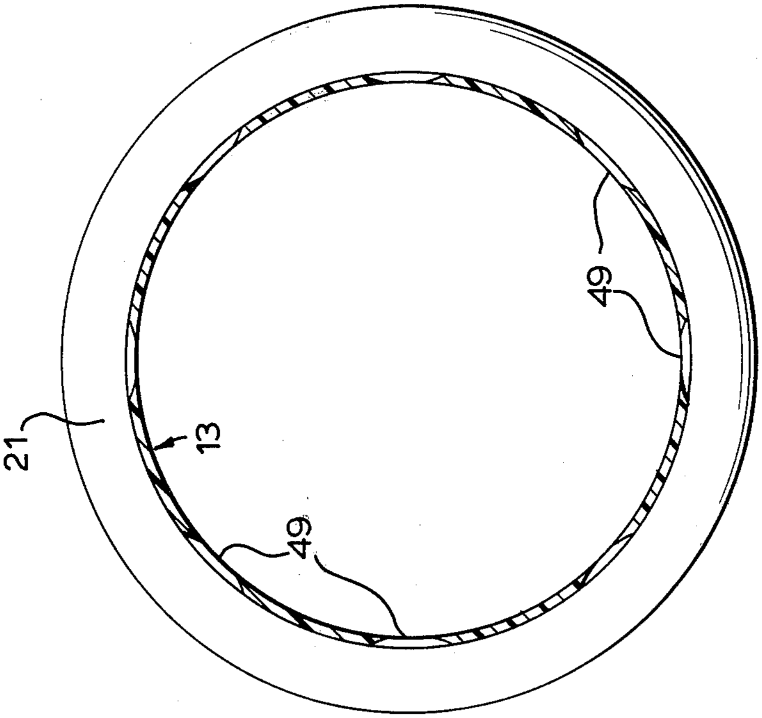
FIG. 12 is a sectioned view on the line 12—12 in FIG. 11.
Figure 11:
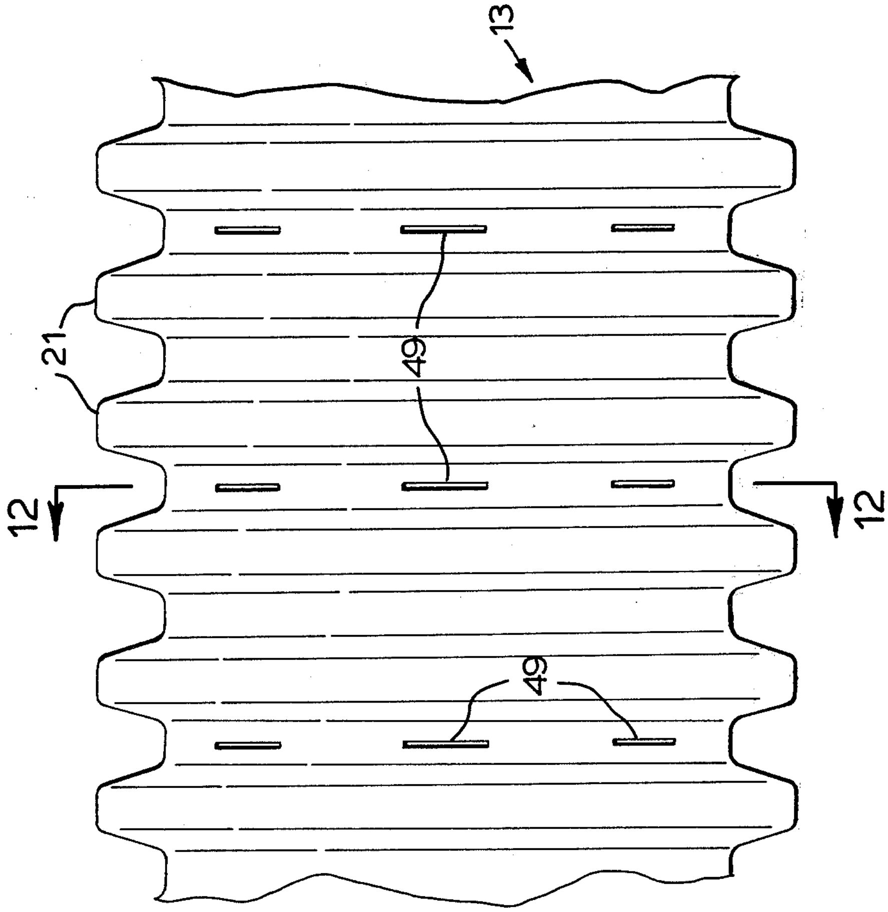
FIG. 11 is a side view of a portion of perforated tubing produced by apparatus according to the preferred embodiment of the invention.

FIGS. 11 and 12 show the perforations 49 in the perforated tubing 13 produced by apparatus according to the preferred embodiment of the invention as hereinbefore described, FIG. 13 showing the form of the perforations 49 produced by the alternative embodiment described above with reference to FIG. 8. In order, as shown in FIG. 10, to alter the lengths of the perforations 49 produced in the tubing 13 the distance to which each cutter 36 outwardly projects from the associated lead screw member 19 is preferably adjustable, this being readily achieved by altering the position of the shank portion 37 of each cutter 36 within the slot 41 of the associated plug 42.

Figure 4A:
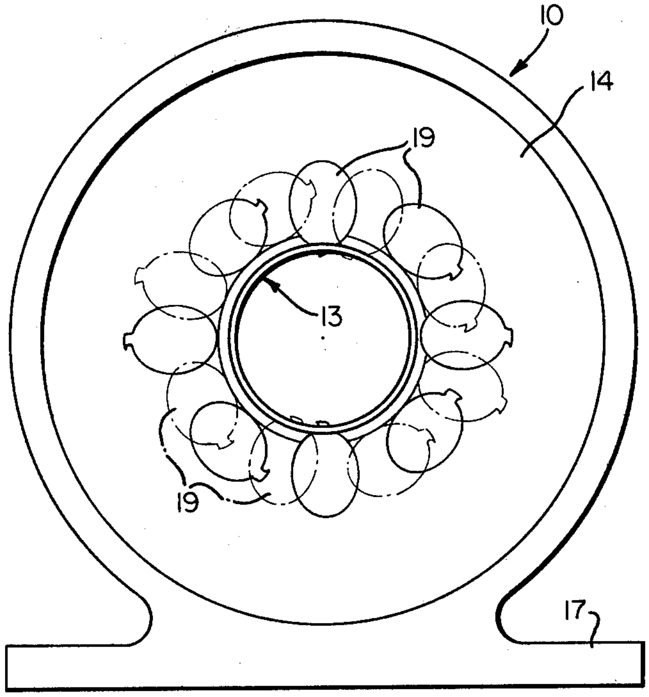
FIG. 4A is a view corresponding to FIG. 4 but with parts omitted for clarity, the view being somewhat diagrammatic and showing a combination according to the invention of a plurality of the apparatuses.

It will be appreciated that the minimum circumferential spacing between adjacent perforations 49 in the tubing 13 is dependent on the minimum spacing which is possible between adjacent ones of the lead screw members 19, and if desired there may be provided, in combination, a plurality of apparatuses as hereinbefore described in which the apparatuses are disposed with the axial paths A thereof in alignment, the cutters 36 of each of the apparatuses being in non-alignment, as viewed in the direction of said axial paths A, with the cutters 36 of each of the other of the apparatuses. In this manner, there may be provided perforations 49 in the tubing 13 between perforations 49 which are circumferentially spaced apart the minimum possible distance when using one apparatus. Such a combination is shown somewhat diagrammatically in FIG. 4A which is a view corresponding to FIG. 4, and which shows in full lines the lead screw members 19 together with the associated cutters 36 of a first apparatus as hereinbefore described, and which shows in chain-dotted lines the lead screw members 19 and the associated cutters 36 of a second apparatus as hereinbefore described, this second apparatus being as will be noted disposed with the axial path A thereof in alignment with the axial path A of the first apparatus and with the cutters 36 of the second apparatus being in non-alignment, as viewed in the direction of the axial paths A, with the cutters 36 of the first apparatus. In FIG. 4A the drive shafts 26 of the first and second apparatuses have for clarity been omitted, and for this reason also the screw threading 20 and the cross-hatching of the lead screw members 19 have also been omitted.

Each lead screw member 19 is preferably formed by drilling or otherwise forming the recess 43 in the cylindrical wall of a cylindrical member, and then mounting the plug 42 within this recess 43 by means of the screw member 44 the head of which is deeply recessed into the cylindrical wall of the cylindrical member. The screw threading 20 is then machined or otherwise formed on the cylindrical wall of the cylindrical member while the plug 42 remains mounted in the recess 43. Thereafter, the slot 41 is formed in the plug 42 by, most conveniently, first removing the plug 42 from the recess 43, and the associated cutter 36 is then mounted within the slot 41 and the plug 42 is remounted within the recess 43 by means of the screw member 44, as hereinbefore described.

It is generally preferred that the perforations 49 in the tubing 13 be provided in the valleys between the corrugations 21, so that each cutter 36, and the associated plug 42, are preferably disposed at the crest of the fluting of the screw threading 20. It will, however, be appreciated that if it is desired to form some or all of the perforations 49 in the corrugations 21 of the tubing 13 rather than solely in the valleys between these corrugations 21 the appropriate cutter or cutters 36, and the associated plug or plugs 42, can of course be disposed between the fluting of the screw threading 20.

Except as hereinafter described the embodiments of the invention illustrated in FIGS. 14 to 20, inclusive, correspond to the preferred embodiment of the invention hereinbefore described with reference to FIGS. 1 to 7, inclusive, 10, 11 and 12 of the drawings, and in FIGS. 14 to 20, inclusive, like reference numerals are used as in FIGS. 1 to 7, inclusive, 10, 11 and 12 to denote like parts.

In the preferred embodiment of the invention as hereinbefore described with reference to FIGS. 1 to 7, inclusive, 10, 11 and 12 the screw threading 20 on each lead screw member 19 extends continuously along the lead screw member 19 so that the tubing 13 operatively continues its advance along the axial path A thereof during the intersection of the tubing 13 by the cutter or cutters 36. This results, of course, in each perforation 49 which is thus formed in the tubing 13 being disposed in a direction having a component parallel to the axial path A of the tubing 13, rather than the perforation 49 being disposed in a direction which is truly circumferential around the tubing 13. In many cases this feature will be quite acceptable, but in some cases this feature may be undesirable and there is accordingly also provided apparatus for perforating tubing in which the perforations operatively formed in the tubing by the apparatus are circumferentially disposed, together with a method of perforating tubing in which the perforations formed in the tubing are circumferentially disposed. Thus, referring to FIGS. 14 and 15 it will be noted that a central portion 50 of each lead screw member 19 is devoid of the screw threading 20, this portion 50 presenting a plurality of, say, three axially spaced ribs 51 which are each circumferentially disposed and are axially spaced from the adjacent screw threading 20. Furthermore each rib 51 extends only partially around the circumference of the lead screw member 19.

During operative rotatable driving of the drive means comprising the lead screw members 19 with resultant advance of the tubing 13 along the axial path A thereof, as hereinbefore described, the ribs 51 of each lead screw member 19 enter into meshing engagement with the corrugations 21 of the tubing 13, as is clearly shown in FIG. 14, at least the leading ends of the ribs 51 preferably being of tapered width to facilitate this entry of the ribs 51 into meshing engagement with the corrugations 21 of the tubing 13. While the ribs 51 are so meshingly engaged with the corrugations 21 of the tubing 13 the associated part of the tubing 13 is restrained against advance along the axial path A thereof, and during this meshing engagement of the ribs 51 with the corrugations 21 of the tubing 13 the cutter 36 intersects said associated part or intersected part of the tubing 13 to perforate the tubing 13, the cutter 36 preferably being mounted on one of the ribs 51 such as the central rib 51 for operative rotation therewith. Thus, since advance of at least the intersected part of the tubing 13 along the axial path A thereof during the intersection of the tubing 13 by the cutter 36 is stopped by, with reference to the embodiment herein described with reference to FIGS. 14 and 15, means constituted by the ribs 51 restraining the intersected part of the tubing 13 against said advance, it will be appreciated that the perforation 49 which is thereby formed in the tubing 13 is disposed in a truly circumferential direction.

The axial spacing between the ribs 51 of each lead screw member 19 and the adjacent screw threading 20 thereof accommodates resilient deformation of the tubing 13 in the direction of the axial path A thereof during the meshing engagement of the ribs 51 with the corrugations 21 of the tubing 13, the tubing 13 being so resiliently deformable by, for example, being formed of a thermoplastic material such as polyethylene, as hereinbefore described. Thus, it will be appreciated that, during the meshing engagement of the ribs 51 of each lead screw member 19 with the corrugations 21 of the tubing 13, the screw threading 20 of the lead screw member 19 on either side of the ribs 51 continues to advance the tubing 13 along the axial path A thereof with resultant resilient extension of the tubing 13 in the portion of the tubing 13 between the ribs 51 and the screw threading 20 which is in advance of the ribs 51 relative to the direction of the axial path A, and with resultant resilient compression of the tubing 13 in the portion of the tubing 13 between the ribs 51 and the screw threading 20 which is behind the ribs 51 relative to the direction of the axial path A. As herein described with reference to FIGS. 14 and 15, the portion 50 of each lead screw member 19 is centrally disposed with screw threading 20 in advance of and behind the portion 50, but it will of course be appreciated that if this portion 50 of the lead screw member 19 is disposed at the forward end of the lead screw member 19 with screw threading 20 only behind this portion 50 the tubing 13 need of course only be resiliently compressible, while conversely if the portion 50 is disposed at the rearward end of the lead screw member 19 with screw threading 20 only in advance of this portion 50 the tubing 13 need of course only be resiliently extendible.

The ribs 51 extend around the associated lead screw member 19 to an extent sufficient to ensure that these ribs 51 are in meshing engagement with the corrugations 21 of the tubing 13 throughout the entirety of the intersection of the tubing 13 by the cutter 36, and thus the extent of the ribs 51 around the circumference of the lead screw member 19 is dependent on the length of the perforations 49 formed in the tubing 13 by the cutter 36. Typically, the ribs 51 may extend around approximately one quarter of the circumference of the lead screw member 19, although it will be noted that as shown in FIG. 15 the central rib 51 on which the cutter 36 is mounted may be of reduced length.

As the ribs 51 disengage from the corrugations 21 of the tubing 13 the above-described resilient deformation of the tubing 13 is of course relieved.

Although as hereinbefore described the portion 50 of the lead screw member 19 is provided with a plurality of the ribs 51 this portion 50 may in alternative embodiments (not shown) be provided with only one such rib 51.

Figure 17:
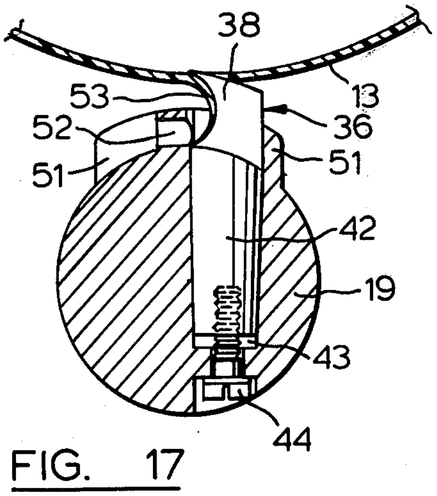
FIG. 17 is a sectioned view on the line 17—17 in FIG. 16.
Figure 16:
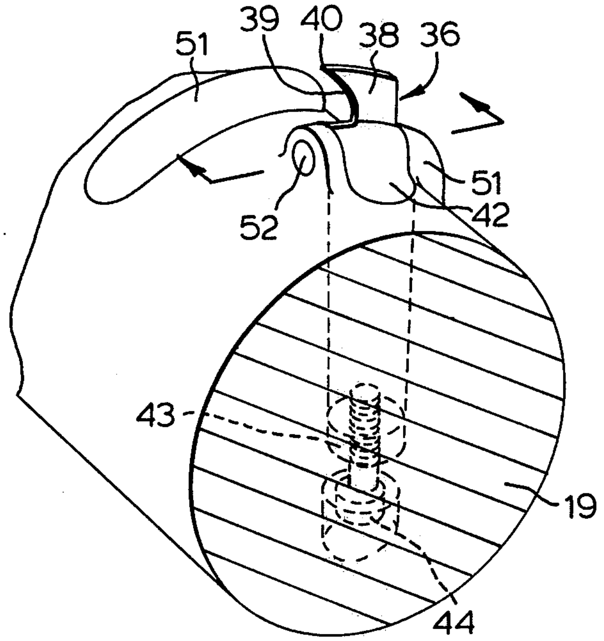
FIG. 16 is a view of part of the apparatus shown in FIGS. 14 and 15.

Referring now to FIGS. 16 and 17, the rib 51 on which the cutter 36 is mounted may be provided with an open-ended bore 52 which is circumferentially formed through the portion of said rib 51 between the leading end of said rib 51 and the recess 43, one end of the bore 52 thereby communicating with the concave leading edge 39 at the end thereof remote from the cutting point 40, so that as the cutter 36 operatively intersects the tubing 13 as shown in FIG. 17 the leading end of the chip 53 which is removed from the tubing 13 to form a perforation 49 therein is directed into the bore 52 for discharge of the chip 53 therethrough. This substantially prevents the trailing end of the chip 53 from remaining attached to the tubing 13 after the intersection of the tubing 13 by the cutter 36 has been completed.

Figure 19:
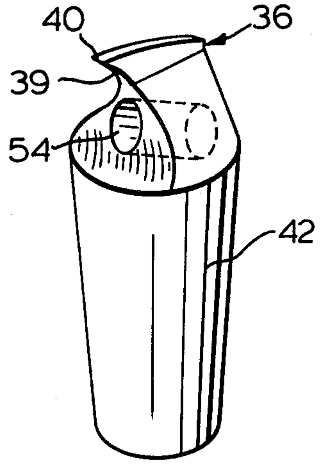
FIG. 19 is a view of part of the apparatus shown in the preceding views, but according to a yet still further embodiment of the invention.

FIG. 19 shows a further embodiment in which the cutter 36 is integrally formed with the plug 42, an open-ended bore 54 the function of which corresponds to that of the bore 52 being provided therethrough for the discharge of the chips 53.

Figure 18:
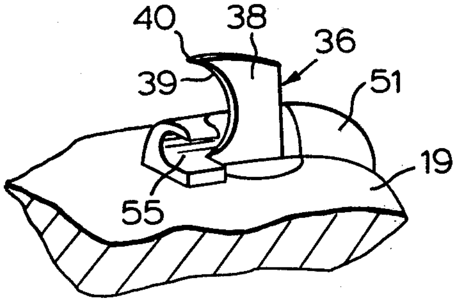
FIG. 18 is a view corresponding to FIG. 16 of a portion of the apparatus shown therein according to a modified form thereof.
Figure 20:
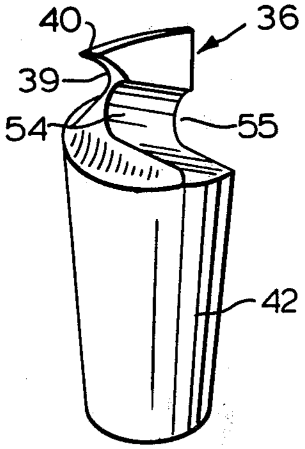
FIG. 20 is a view corresponding to FIG. 19, but showing the part of the apparatus illustrated therein according to a modified form thereof.

FIGS. 18 and 20 show correspondingly modified forms of the structures illustrated in FIGS. 16 and 17 and in FIG. 19, respectively, in which a side 55 of each bore 52 and 54 is open in a direction transverse to the plane containing the rotary path of the cutter 36 for facilitating clearing of the chips 53, thereby to avoid any risk of these chips 53 clogging the bore 52 or 54, respectively.

While in the preferred embodiment of the invention as hereinbefore described with reference to the accompanying drawings, the drive means for advancing the tubing 13 along the axial path A comprises the plurality of lead screw members 19 it will be appreciated that in alternative embodiments (not shown) there may be provided only one lead screw member 19 for advancing the tubing 13 along the axial path A, or other means may be provided for advancing the tubing 13 which need not be of corrugated form, along the axial path A. Where the tubing 13 is of currugated form said other means may comprise for example a rotatably drivable gear wheel the axis of rotation of which is at right angles to the axial path A and the teeth of which engage with the corrugations 21 of the tubing 13.

Furthermore, the apparatus may incorporate any number of cutters 36 each mounted for movement only in a fixed rotary path of circular form which intersects the tubing 13 and which is in a plane substantially at right angles to the axial path A, including only a single such cutter 36. The cutter or cutters 36 may, of course, be so mounted other than on the lead screw member or members 19, even where the drive means comprises one or more lead screw members 19. If, of course, the number and disposition of the cutters 36 is such that cutters 36 of a pair thereof do not substantially simultaneously intersect the tubing 13 while rotating in opposite directions alternative means is provided for restraining the tubing 13 against rotation thereof about the axial path A during operative intersection of the tubing 13 by the cutter or cutters 36. In addition, if the drive means for advancing the tubing 13 along the axial path A is constituted by other than the lead screw members 19 alternative support means may be required for supporting the tubing 13 between the end housings 10 and 11.

What we claim as our invention is:

1. Apparatus for perforating tubing, the apparatus comprising:

drive means for advancing the tubing along an axial path thereof, at least one pair of cutters mounted for rotation about respective fixed axes spaced from and substantially parallel to said axial path of the tubing, the cutters of each pair being mounted for rotation through complete revolutions about said fixed axes along fixed circular paths which intersect the tubing for intermittent intersection of the tubing by the cutters at discrete points on the tubing, and means for rotating the cutters of each pair in synchronism in opposite directions for substantially simultaneous intersection with the tubing, whereby the cutters support the tubing to restrain it against rotation during operative intersection of the tubing by the cutters.

2. Apparatus according to claim 1, wherein the cutters of each pair are diametrically opposed relative to said axial path of the tubing.

3. Apparatus for perforating tubing, the apparatus comprising:

drive means for advancing the tubing along an axial path thereof, at least one cutter mounted for rotation about a fixed axis spaced from and substantially parallel to said axial path of the tubing, the cutter being mounted for rotation through complete revolutions about said fixed axis along a fixed circular path which intersects the tubing for intermittent intersection of the tubing by the cutter at discrete points on the tubing, and the cutter being provided with an open-ended bore for discharge therethrough of chips removed from the tubing in forming the perforations therein.

4. Apparatus according to claim 3, wherein a side of said bore is open in a direction transverse to the plane of said path of the cutter.

5. A method of perforating tubing, the method comprising:

advancing the tubing along an axial path thereof, simultaneously rotating at least one pair of outwardly directed cutters in opposite directions about respective fixed axes which are spaced from and substantially parallel to said axial path of the tubing, the cutters rotating along fixed circular paths which intersect the tubing at discrete points, and synchronizing the rotation of the cutters for substantially simultaneous intersection with the tubing whereby the cutters support the tubing to restrain it against rotation during operative intersection of the tubing by the cutters.

6. A method of perforating corrugated tubing, the method comprising the steps of advancing the tubing along an axial path thereof, and simultaneously rotating at least one outwardly directed cutter through complete revolutions about a fixed axis from which the cutter is spaced and which is spaced from and substantially parallel to said axial path of the tubing, said rotation of the cutter being along a fixed circular path which intersects the tubing thereby to perforate the tubing by intermittent intersection of the tubing by the cutter at discrete points on the tubing, the tubing being supported and being restrained against rotation thereof about said axial path during intersection of the tubing by the cutter, wherein said advancing of the tubing along said axial path thereof comprises rotatably driving at least one lead screw member which is disposed substantially parallel to said axial path of the tubing and screw threading of which is in meshing engagement with corrugations presented by the tubing, the cutter which is mounted on the lead screw member being rotated therewith.

7. A method according to claim 6, wherein said advancing of the tubing along said axial path thereof comprises rotatably driving in opposite directions lead screw members of at least one pair thereof, each lead screw member being disposed substantially parallel to said axial path of the tubing and having screw threading in meshing engagement with corrugations of the tubing, with the screw threading of each pair of the lead screw members on which a pair of cutters is mounted being of opposite hand.

8. A method according to claim 6, wherein the, or each, cutter intersects the tubing in the valleys between the corrugations.

9. A method of perforating corrugated tubing, the method comprising the steps of advancing the tubing along an axial path thereof, and simultaneously rotating at least one outwardly directed cutter through complete revolutions about a fixed axis from which the cutter is spaced and which is spaced from and substantially parallel to said axial path of the tubing, said rotation of the cutter being along a fixed circular path which intersects the tubing thereby to perforate the tubing by intermittent intersection of the tubing by the cutter at discrete points on the tubing, and the tubing being supported and being restrained against rotation thereof about said axial path during intersection of the tubing by the cutter, wherein said advancing of the tubing along said axial path thereof comprises rotatably driving at least one lead screw member which is disposed substantially parallel to said axial path of the tubing and has screw threading in meshing engagement with corrugations of the tubing, said method further comprising the step of stopping advance of at least the intersected part of the tubing along the axial path thereof during intersection of the tubing by the cutter.

10. A method according to claim 9, wherein said step of restraining the intersected part of the tubing against advance along the axial path thereof during intersection of the tubing by the cutter comprises meshingly engaging with the corrugations of the tubing at least one circumferentially disposed rib on which the cutter is mounted for rotation therewith, which rib extends only partially around the circumference of the lead screw member and is presented by a portion of the lead screw member devoid of the screw threading, and which is axially spaced from the adjacent screw threading, the tubing being resiliently deformable in the direction of the axial path thereof.

11. Apparatus for perforating corrugated tubing, the apparatus comprising:

drive means for advancing the tubing along an axial path thereof, said drive means comprising at least one lead screw member having screw threading for meshing engagement with the corrugations of the tubing, the lead screw member being rotatably drivable about a fixed axis spaced from and substantially parallel to said axial path of the tubing for advancing the tubing therealong, at least one outwardly directed cutter mounted on a respective said lead screw member for rotation therewith about said fixed axis along a fixed circular path which intersects the tubing for intermittent intersection of the tubing by the cutter at discrete points on the tubing, and support means for supporting the tubing and restraining the tubing against rotation thereof about said axial path during operative intersection of the tubing by the cutter.

12. Apparatus according to claim 11, wherein a plurality of the cutters is mounted on the, or each, lead screw member.

13. Apparatus according to claim 11, wherein each cutter mounted on a respective said lead screw member projects outwardly from the crest of the fluting of the screw threading thereof for intersection with the valleys between the corrugations of the tubing.

14. Apparatus according to claim 13, wherein the distance to which the, or each, cutter outwardly projects is adjustable.

15. Apparatus according to claim 11, wherein each cutter mounted on a respective said lead screw member includes a shank portion disposed within a slot in a mounting plug, the plug being removably mounted in a recess in the lead screw member with the shank portion of the cutter being clamped in said slot under the influence of the interengagement between the plug and the recess.

16. Apparatus according to claim 11, wherein each cutter comprises a cutting portion in the form of a loop having a leading edge constituting a cutting edge.

17. Apparatus according to claim 11, wherein the drive means includes means for stopping advance of at least the intersected part of the tubing along the axial path thereof during intersection of the tubing of the cutter.

18. Apparatus according to claim 17, wherein a portion of each lead screw member is devoid of said screw threading, said portion of said lead screw member having at least one circumferentially disposed rib which extends only partially around the circumference of the lead screw member and which is axially spaced from the adjacent screw threading, and the rib being disposed for meshing engagement with the corrugations of the tubing during the intersection of the tubing by the cutter, whereby the intersected part of the tubing is restrained against advance along the axial path thereof during intersection of the tubing by the cutter, the tubing being resiliently deformable in the direction of the axial path thereof.

19. Apparatus according to claim 18, wherein the rib extends around approximately one quarter of the circumference of the lead screw member.

20. Apparatus according to claim 18, wherein the cutter is mounted on the rib for rotation therewith.

21. Apparatus according to claim 20, wherein the rib on which the cutter is mounted is provided with an open-ended bore for discharge therethrough of chips removed from the tubing in forming the perforations therein, one of the open ends of the bore being disposed adjacent the cutter for receiving the chips as the chips are cut from the tubing by the cutter.

22. Apparatus according to claim 18, wherein said at least one rib comprises a plurality of axially spaced ribs.

23. Apparatus according to claim 11, wherein the cutter is provided with an open-ended bore for discharge therethrough of chips removed from the tubing in forming the perforations therein.

24. Apparatus according to claim 23, wherein a side of the bore is open in a direction transverse to the plane containing the rotary path of the cutter.

25. Apparatus for perforating corrugated tubing, the apparatus comprising:

drive means for advancing the tubing along an axial path thereof, at least one pair of cutters mounted for rotation about respective fixed axes spaced from and substantially parallel to said axial path of the tubing, the cutters of each pair being mounted for rotation through complete revolutions about said fixed axes along fixed circular paths which intersect the tubing for intermittent intersection of the tubing by the cutters at discrete points on the tubing, and means for rotating the cutters of each pair in synchronism in opposite directions for substantially simultaneous intersection with the tubing, whereby the cutters support the tubing to restrain it against rotation during operative intersection of the tubing by the cutters, wherein each cutter is mounted on a lead screw member which is disposed substantially parallel to said axial path of the tubing and which constitutes said drive means, each lead screw member threading for meshing engagement with the corrugations of the tubing, with the screw threading of each pair of the lead screw members on which a pair of the cutters is mounted being of opposite hand, and with the lead screw members of each said pair thereof being rotatably drivable in opposite directions for advancing the tubing along said axial path.

26. Apparatus according to claim 25, wherein the cutters of each pair thereof are diametrically opposed relative to said axial path.

* * * * *